(12) United States Patent
Das et al.

(10) Patent No.: US 11,163,730 B2
(45) Date of Patent: Nov. 2, 2021

(54) HARD LINK OPERATIONS FOR FILES IN A FILE SYSTEM

(71) Applicant: MICROSOFT TECHNOLOGY LICENSING, LLC, Redmond, WA (US)

(72) Inventors: Rajsekhar Das, Sammamish, WA (US); Omar Carey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 16/411,133

(22) Filed: May 13, 2019

(65) Prior Publication Data

US 2020/0364190 A1 Nov. 19, 2020

(51) Int. Cl.
*G06F 16/18* (2019.01)
*G06F 16/182* (2019.01)
*G06F 16/16* (2019.01)
*G06F 16/22* (2019.01)

(52) U.S. Cl.
CPC ........ *G06F 16/1858* (2019.01); *G06F 16/166* (2019.01); *G06F 16/182* (2019.01); *G06F 16/2246* (2019.01); *G06F 16/2282* (2019.01)

(58) Field of Classification Search
CPC .................................................... G06F 16/166
See application file for complete search history.

(56) References Cited

U.S. PATENT DOCUMENTS

| 10,628,263 | B1* | 4/2020 | Cowen | G06F 11/1435 |
| 2002/0116593 | A1* | 8/2002 | Kazar | G06F 16/16 |
| | | | | 711/202 |
| 2006/0106878 | A1* | 5/2006 | Shitomi | G06F 16/10 |
| 2008/0183662 | A1* | 7/2008 | Reed | G06F 16/172 |

(Continued)

OTHER PUBLICATIONS

"Hard Link", Retrieved From: https://en.wikipedia.org/w/index.php?title=Hard_link&oldid=862682029, Oct. 6, 2018, 5 Pages.

(Continued)

*Primary Examiner* — William Spieler
(74) *Attorney, Agent, or Firm* — Shook, Hardy & Bacon, L.L.P.

(57) ABSTRACT

Methods, systems, and computer storage media for providing data operations using hard links (hard link operations) for files in a file system are provided. Accessing files using hard link operations is based on File_Name-to-File_ID mappings and File_ID-to-File_Object mappings stored in hard link data structures. In operation, a file name for file content is received to perform a data operation. The file content is accessed using the file name. The file name is associated with a hard link data structure having a File_Name-to-File_ID mapping and a File_ID-to-File_Object mapping. The file name is also associated with an alternate file name for the file content. The alternate file name is associated with an alternate hard link data structure having an alternate File_Name-to-File mapping and the File_ID-to-File_Object mapping. The alternate file name is received. The file content is accessed using the alternate file name to perform an alternate data operation on the file content.

20 Claims, 6 Drawing Sheets

(56) References Cited

U.S. PATENT DOCUMENTS

| | | | |
|---|---|---|---|
| 2013/0262395 A1* | 10/2013 | Levinshtein | G06F 16/162 |
| | | | 707/674 |
| 2014/0236895 A1* | 8/2014 | Gowda | H04L 67/1097 |
| | | | 707/634 |
| 2015/0234712 A1 | 8/2015 | Fei et al. | |
| 2015/0269214 A1 | 9/2015 | Avati et al. | |
| 2017/0295239 A1* | 10/2017 | Fang | G06F 11/1461 |

OTHER PUBLICATIONS

"International Search Report and Written Opinion Issued in PCT Application No. PCT/US20/031944", dated Jul. 7, 2020, 12 Pages.

\* cited by examiner

HARD LINK OPERATIONS FOR FILES IN A FILE SYSTEM

BACKGROUND

Users rely on file systems for organizing data and files on computing systems. A file system, such as a resilient file system (ReFS), provides structure and logic rules to manage storage and retrieval, and, naming and grouping of data. For example, a file system, such as ReFS, can operate using independent or isolated directories as B+ tables, and embedded B+ tables for files, where embedded B+ tables are accessible using file names or file identifiers (file IDs). As more and more functionality are supported using file systems, hard link operations for a data access mechanism are important to improve the accessibility of files in a file system.

SUMMARY

Various aspects of the technology described herein are generally directed to systems, methods, and computer storage media, for among other things, providing data operations (e.g., read, write, or update) using hard links (i.e., hard link operations) for files and directories in a file system. In particular, hard link operations are executed based a hard link data structure having both a File_Name-to-File_ID mapping and a File_ID-to-File_Object mapping. For example, a file name is used to reference a file ID (i.e., hard link identifier), and the file ID is used to reference a file object (e.g., embedded B+ table). The hard link data structure replaces a non-hard-link data structure, the non-hard-link data structure merely maps a file name to a file object and maps a file ID to a file name. The hard link operations support accessing a single file using different names. The hard link operations also support accessing a single file (e.g., file content) using different names in different folders.

By way of background, a file system (e.g., a resilient file system—ReFS) can provide the structure and logic rules used to manage storing and retrieving data, and naming and grouping data. Directories can be implemented as independent or isolated B+ tables, with corresponding files of the directories as embedded B+ tables. The files are accessible using a non-hard-link data structure (non-hard-link data access mechanism), where the embedded B+ tables are accessible using file IDs or file names. While the file system may need the independent directory policy to operate, the file system may also need functionality in computing resources that operate based on hard links.

A hard link is a directory entry that associates a name with a file in a file system. Hard links specifically allow one file to have multiple names (e.g., different names in different directories) all of which independently connect to the same data on the disk, none of which depends on any of the others. Even though the conventional data access mechanism of a file system may provide access to files using a non-hard-link data access mechanism (no support for hard links), the file system may lack interoperability with other file systems, and other applications and services that operate using hard links. Moreover, implementing hard links while still maintaining an independent directory policy provides several challenges. As such, an alternative approach for providing a data access mechanism to support hard link operations for files in a file system would improve computing operations for more compatibility with other computing resources.

Aspects of the technical solution described in the present disclosure are directed towards improving a non-hard-link data access mechanism with a hard-link data access mechanism for performing file system operations for files in a file system. In particular, while performing file system operations, a file is accessible using multiple names (e.g., different names in different directories) all of which independently connect to the same data on the disk, none of which depends on any of the others. For example, certain applications or services need multiple names for a single file, which are accessible through hard links that are supported in the file system, such that a particular name instance can be deleted but the file itself remains accessible via another name instance. A file system may rekey files from a non-hard-link data access mechanism to a hard-link data access mechanism having a File_Name-to-File_ID mapping and a File_ID-to-File_Object mapping. Rekeying may be performed for configuring existing files for hard link operations, and as such, rekeying may not be needed for new files that are created with the hard-link data access mechanism already in place in the file system. With rekeyed files or new files operating with the hard-link data access mechanism, the mapping may be implemented using a table having rows with key-value pairs. In this way, a file can be accessed based on a set of two key-value pairs (i.e., both File_Name-to-File_ID and File_ID-to-File_Object).

In operation, a file name for file content is received. The file content is accessed using the file name, the file content is accessed to perform a data operation (e.g., read operation, write operation, renaming operation). The file name is associated with a hard link data structure having a File_Name-to-File_ID mapping and a File_ID-to-File_Object mapping. The file content can also be accessed using a file identifier associated with the hard link data structure having the File_Name-to-File_ID mapping and the File_ID-to-File_Object mapping. The file name is further associated with an alternate file name for the file content. The alternate file name is associated with an alternate hard link data structure having an alternate File_Name-to-File mapping and the File_ID-to-File_Object mapping. The alternate file name is received. The file content is accessed using the alternate file name to perform an alternate data operation on the file content. Additional aspects of the technical solution are described below, by way of exemplary implementations, with reference to technical environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1A:
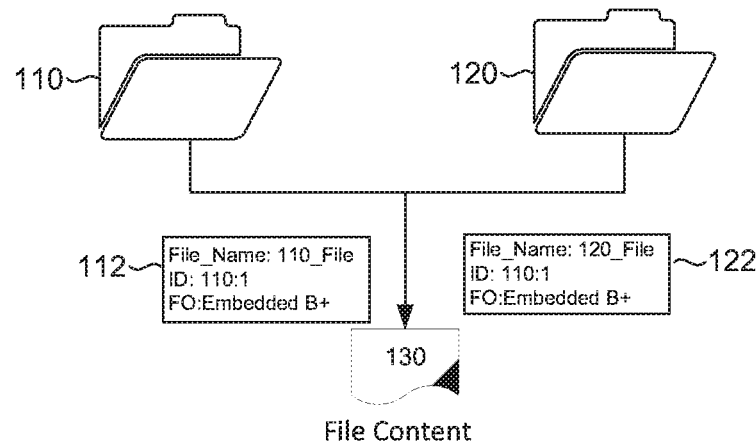
FIGS. 1A and 1B are block diagrams of exemplary environments for providing hard link operations for files in a file system, suitable for use in implementing aspects of the technology described herein.

Overview of Aspects of the Technological Improvement

A file system, such as a resilient file system (ReFS), provides structure and logic rules to manage storing and retrieving data, and naming and grouping data. The file system operates to maximize data availability, scale efficiently to large data sets across diverse workloads, and provide data integrity by means of resiliency to corruption. For example, a file system, such as ReFS, can operate using independent or isolated directories that can be implemented for parallelism and throughput. A locking mechanism for updates on directories can be executed based a directory flushing operation can be performed independently of other directories. Independent or isolated directories can be implemented as B+ tables, and embedded B+ tables for files, where embedded B+ tables are accessible using file names or file identifiers (file IDs). In particular, directories are stored on-disk to a corresponding B+ table and exposed through a global table. The global table indicates (e.g., using a unique monotonically increasing identifier) the location of the directory on-disk storage; however the inherent on-disk format of B+ trees has been a barrier to implementing hard links, thus limiting any advantages available to other file systems that do implement hard links.

By way of background, a file system engine in a conventional data access mechanism of a file system may provide access to files using a non-hard-link data access mechanism, without hard links. The non-hard-link data access mechanism may be implemented as a data access mechanism that maps file names to file objects (e.g., embedded B+ tables) and file IDs to file names. The data access mechanism may define in a table-row implementation as key-value pairs. As such, a file name can be used to access a file object; or a file ID can be used to access a file name and then redirects (a next hop) from file name to the file object. The key-value pairs can be implemented in different directories, where the directories have unique identifiers to operate independently of each other, and to uniquely identify files in the directories. The directories can be searched via the key-value pairs to identify files associated with corresponding file objects.

As the non-hard-link data access mechanism does not support hard links, the file system lacks interoperability with other file systems and other applications and services that operate using hard links. Several other types of file systems support hard links; however, the underlying implementation of such file systems is not based on independent or isolated directories as B+ tables with embedded B+ tables. For example, for an example file system where the file system is implemented simply as a single table, then a hard link implementation is merely another reference to a file name on the table. As such, an alternative approach for providing a data access mechanism to support hard link operations for files in a file system would improve computing operations for more compatibility with other computing resources Embodiments of the present invention are directed to simple and efficient methods, systems, and computer storage media for providing data operations using hard links (hard link operations) for files in a file system. At a high level, a non-hard-link data access mechanism is replaced with a hard-link data access mechanism for files in a file system. In particular, while performing file system operations, a file is accessible using multiple names (e.g., different names in different directories) all of which independently connect to the same data on the disk, none of which depends on any of the others. For example, certain applications or services need multiple names for a single file, which are accessible through hard links, such that a particular name instance can be deleted but the file itself remains accessible via another name instance. A file system may rekey files from a non-hard-linked data access mechanism (i.e., file name to a file object and maps a file ID to a file name mappings) to a hard-link data access mechanism (i.e., file name to file ID and file ID to file object mappings). Rekeying may be performed for configuring existing files for hard link operations, and as such, rekeying may not be needed for new files that are created with the hard-link data access mechanism already in place in the file system. The mapping may be implemented using a table having rows with key-value pairs. In this way, a file can be accessed using multiple names based on a set of two key-value pairs (i.e., File_Name-to-File_ID and File_ID-to-File_Object).

Figure 1B:
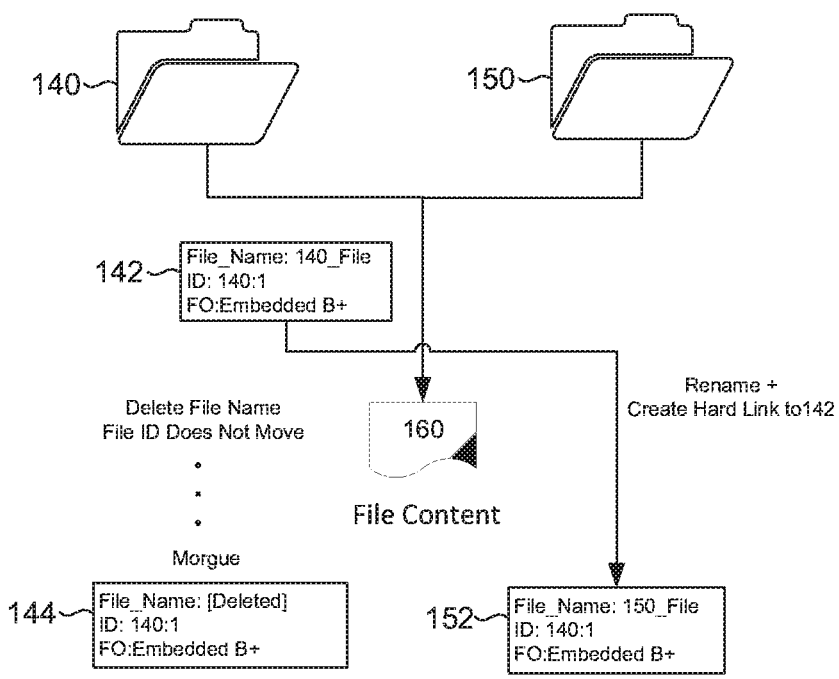

Aspects of the technical solution can be described by way of examples and with reference to a file system operating environment in FIG. 1A and FIG. 1B. A file system engine (not shown) typically manages operations, such as storage management, file naming, directories or folders, metadata, access rules and privileges. FIG. 1A includes a directory table 102 having rows 104, 106, and 108 and corresponding to key-value pairs. In particular, Row 1 includes File_Name and File_ID (i.e., File_Name-to-File_ID); Row 2 includes File_ID-to-File_Object; and Row 3 includes File_ID-to-File_ID. It is contemplated that Row 3 is optionally implemented to support legacy operations and backwards compatibility, as discussed in more detail below. FIG. 1A further includes directory 110 and directory 120 each having hard link data structures (e.g., table 102) represented as hard link data structure 112 and hard link data structure 122. Directory 110 and directory 120 are associated with file content (e.g., in-memory or on-disk data) 130.

The file name 110_File can be received to access the file content 130. The file content is accessible using the file name 110_File in the hard link data structure 112. The file name 110_File is in the hard link data structure 112 having at least the File_Name-to-File_ID mapping and a File_ID-to-File_Object mapping. For example, File_ID-to-File_Object can be for ID 110:1 to an embedded table for the file content 103. In this way, the file name 110_File is used to identify the file ID 110:1, which is then used (next hop) to identify file object (i.e., embedded B+ table) for the file ID 110:1. Accessing the file name in this manner may alternatively be described as traversing (or hopping) using the mappings of the hard link data structure to identify the File_Object (i.e., the embedded B+ table) which corresponds to the file content 130.

As shown in table 102, the hard link data structure can be configured as a table having mappings as key-value pairs in corresponding rows and columns. The hard link data structure can implemented in a file system based on independent directories represented as tables comprising embedded tables as file objects for accessing files. The file system operates based on isolating functionality of the independent directories as isolated tables based on an independent directory policy of the file system that supports parallelism and throughput.

With reference to directory 120 with file name 120_File and file ID 110:1, the file name 110_File in directory 112 corresponds to (based on a hard link) the file name 120_File (i.e., alternate file name) in directory 120. The file name 120_file is also for the file content 130. As represented in hard link data structure 122, the file name 120_File has an alternate File_Name-to-File_ID mapping and the File_ID-to-File_Object mapping. In particular, even though the File_Name-to-File_ID mapping is different, the File_ID-to-File_Object mapping is the same. As such, the file name 120_File can be received to access the file content 130 using the file name 120_File and the hard link data structure 122. Additionally, the file content 130 can be accessed using the file ID, where the file ID is received and the file ID maps to the file object. In particular, for the corresponding directory 110 and directory 120, each having hard link data structure 122 for access to file content 130, the same file ID 110:1 is used for File_Name-to-File_ID mapping and a File_ID-to-File_Object mapping.

With reference to FIG. 1B, the file system further supports renaming the file name for the file content across directories (e.g., cross-directory renaming operation). The cross-directory renaming operation renames a file name for file content based on creating a different hard link data structure with a different file name for the file content in a different directory. As shown, FIG. 1B includes directory 140 having hard link data structure 142 and directory 150 with hard link data structure 152 based on executing the cross-directory renaming operation. In this way, the file content 160 is accessible using the file name 150_file based on the file ID 140:1 that stays the same in the hard link data structure 152.

With continued reference to FIG. 1B, the file system further supports deleting (e.g., a delete operation) the file names and directories for the file content that has an alternate file name. The delete operation deletes the file name for a file content but does not delete the hard link data structure 142. Instead, the hard link data structure is maintained (e.g., hard link data structure 144—morgue hard link data structure) with the file name deleted; however still having the file ID (e.g., file ID 140:1). In this way, File_Name-to-File_ID mapping is removed and the File_ID-to-File_Object is still available to provide access to the file content using the file ID. As such, receiving file name 150_File can still provide access to the file content 160 using the morgue hard link data structure having the file ID 140:1 even when the file name 140_File has been deleted. In this way, the morgue hard link data structure operates to maintain File_ID-to-File_Object mappings in a hard link data structure associated with deleted directories.

Aspects of the technical solution of this disclosure have been described with reference to several inventive features and advantages associated with a file system improves on hard link operations for files in file systems. In particular, based the hard link data structure functionally combines a file name, an alternate file name, a file identifier. The file identifier is associated with the hard link data structure having the File_Name-to-File_ID mapping and the File_ID-to-File_Object mapping and the alternate file name associated with the alternate hard link data structure having the alternate File_Name-to-File_ID mapping and the File_ID-to-File_Object mapping. The hard link data structure operates with the independent directory policy of the file system such that hard links are implemented for data operations to support interoperability between the file system and other computing resources (e.g., applications and services) that use hard links. Overall, a practical application of aspects of the technical solution described results in improvements based on less CPU computation, smaller memory requirements, and increased flexibility in file systems over conventional non-hard-link implementations.

Figure 2:
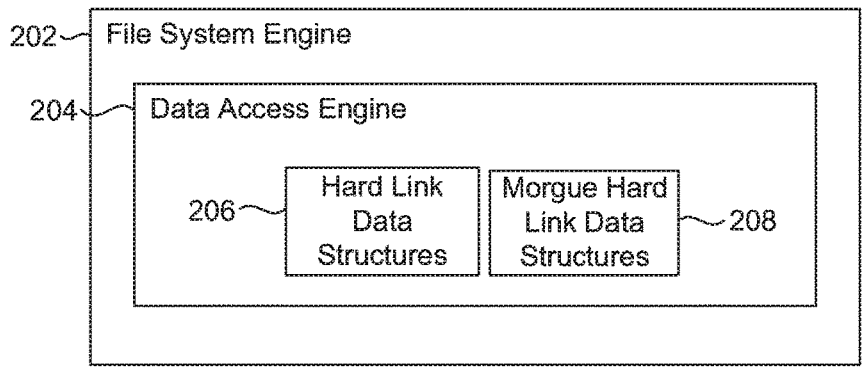
FIG. 2 is an exemplary file system engine in accordance with aspects of the technology described herein.

Overview of Example Environments for Providing Hard Link Operations for Files in File Systems Turning to FIG. 2, a block diagram of an exemplary technical solution environment (file system environment 200) suitable for use in implementing embodiments of the technical solution are shown. Generally the technical solution environment includes a technical solution system suitable for providing hard link operations for files in file systems. The file system environment 200 includes a file system engine 202 having a data access engine 204 including hard link data structures 206 and a morgue hard link data structures 208.

The data access engine 204 is responsible for providing access to file content for performing data operations using hard links. In operation, the data access engine supports, receiving a file name for file content; and accessing the file content using the file name. The file name is associated with a hard link data structure (e.g., hard link data structures 206) having a File_Name-to-File_ID mapping and a File_ID-to-File_Object mapping. The data access engine also simultaneously supports receiving an alternate file name for the file content; and accessing the file content using the alternate file name and an alternate hard link data structure (e.g., hard link data structures 206). The file name is associated with the alternate file name for the file content. The alternate file name is associated with an alternate hard link data structure having an alternate File_Name-to-File_ID mapping and the File_ID-to-File_Object mapping.

The data access engine 204 further supports receiving a file identifier for the file content; and accessing the file content using the file identifier. The file identifier is associated with the hard link data structure having the File_Name-to-File_ID mapping and the File_ID-to-File_Object mapping and the alternate hard link data structure having an alternate File_Name-to-File_ID mapping and the File_ID-to-File_Object mapping. The hard link data structure is a table having mappings as key-value pairs in corresponding rows and columns. The hard link data structure is implemented in a file system based on independent directories represented as tables comprising embedded tables as file objects for accessing files. The file system operates based on isolating functionality of the independent directories as isolated tables based on an independent directory policy of the file system that supports parallelism and throughput.

It is contemplated that the data access engine 204 can further support legacy operations and backwards compatibility features of the file system. For example a legacy operation may access the file File_ID-to-File_ID mapping, and then (next hop) to File_ID-to-File_Object to performing legacy operations that were previously programmed for the non-hard-link data structure. In this way, even with the hard-link data structure described herein, the legacy operation and backwards compatibility features can be available in the file system.

The data access engine 204 further supports a cross-directory renaming operation. Operations on file content can include renaming the file name for the file content in a different directory. Renaming the file name includes creating a different hard link data structure with a different file name for the file content, the different hard link data structure is created in the different directory. The different hard link data structure includes the different File_Name-to-File_ID mapping and the File_ID-to-File_Object mapping.

The data access engine 204 also supports deleting file names or directories based on a morgue hard link data structure that provides access to the file content until all references to the file content are deleted. In operation, the data access engine deletes the file name in the hard link data structure but maintains the File_ID-to-File_Object mappings in a hard link data structure (i.e., morgue hard link data structures 208) associated with deleted file name. The file name may be deleted as part of the deleting the directory (e.g., delete directory operation), as such, the morgue hard link data structure is maintained for deleted file names or deleted directories.

Figure 3:
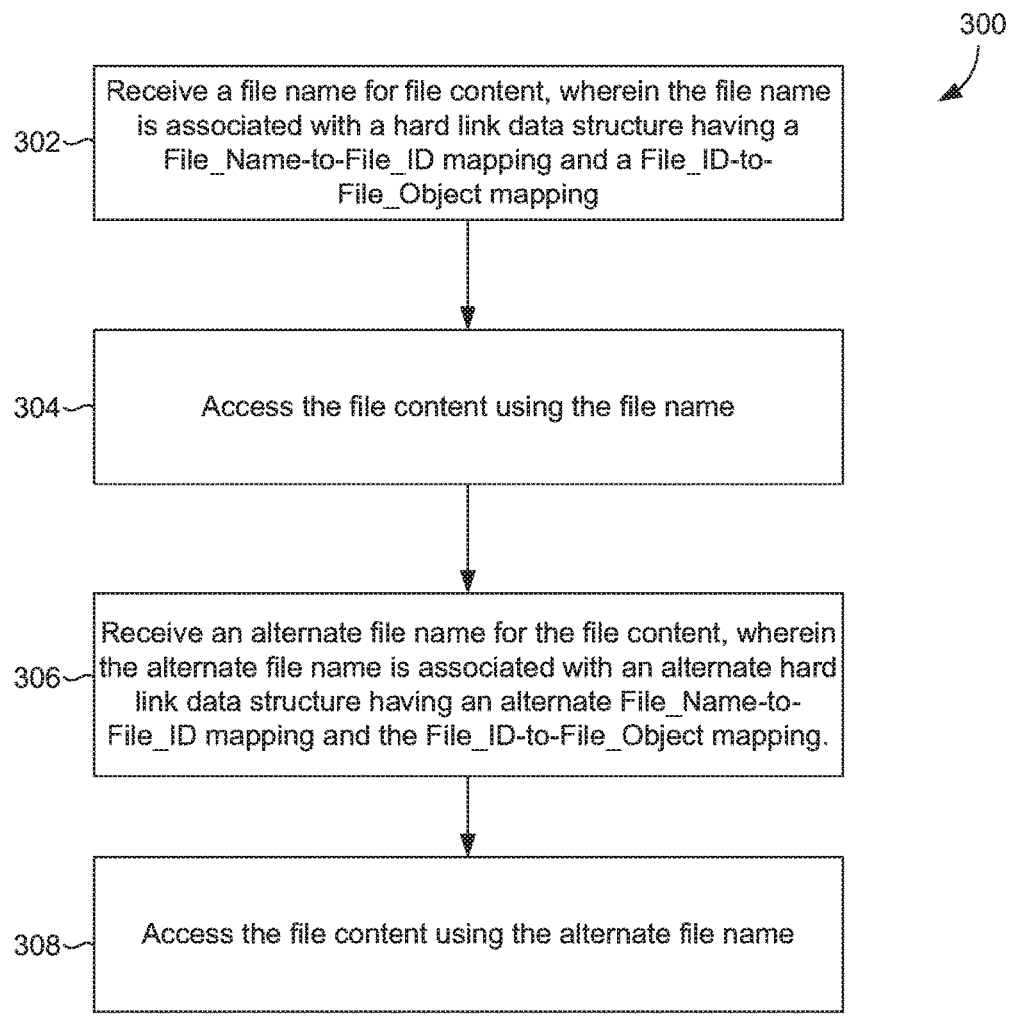
FIG. 3 provides a first exemplary method of providing hard link operations for files in a file system in accordance with aspects of the technology described herein.
Figure 4:
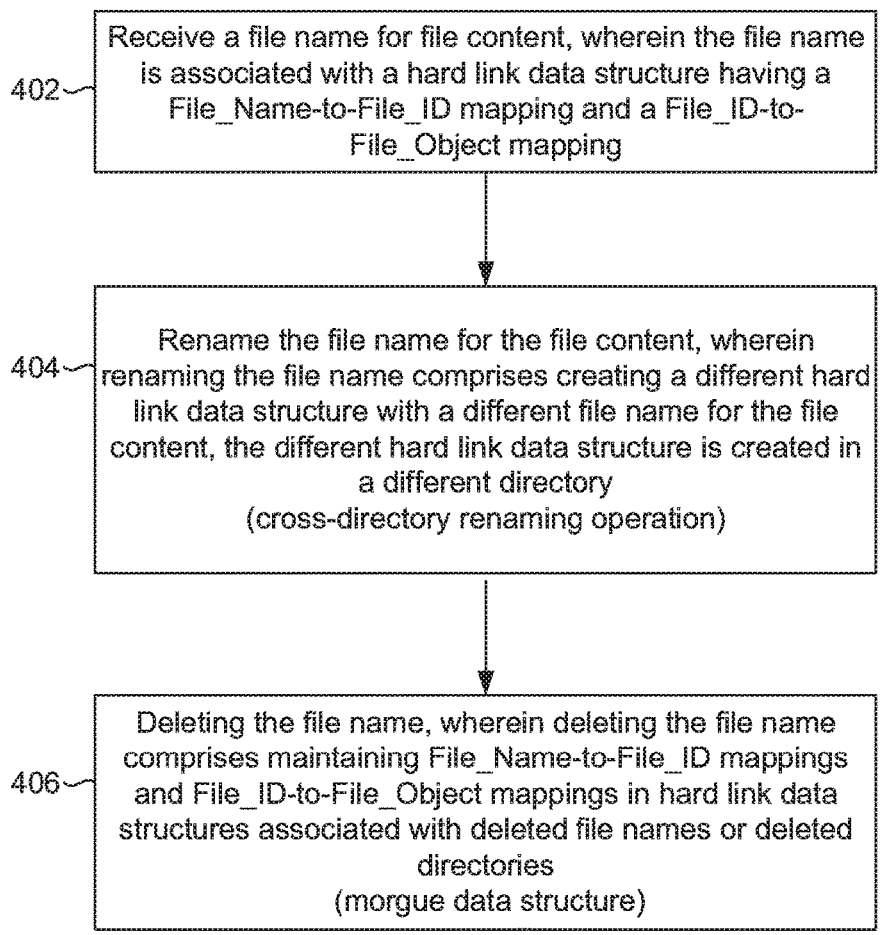
FIG. 4 provides a second exemplary method of providing hard link operations for files in a file system, in accordance with aspects of the technology described herein.
Figure 5:
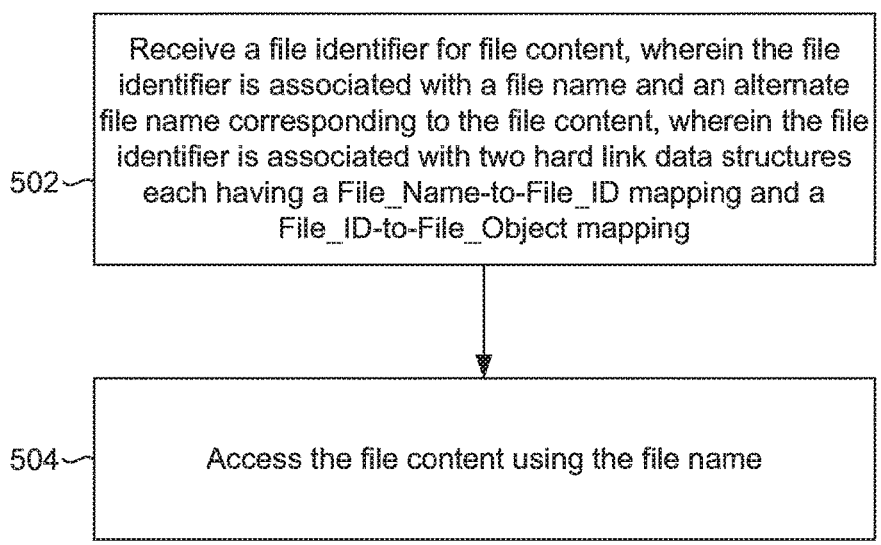
FIG. 5 provides a third exemplary method of providing hard link operations for files in a file system, in accordance with aspects of the technology described herein.

Exemplary Methods for Providing Hard Link Operations for Files in a File System With reference to FIGS. 3, 4 and 5, flow diagrams are provided illustrating methods for performing hard link operations for files in a file system (technical solution system). The methods may be performed using the technical solution system described herein. In embodiments, one or more computer storage media having computer-executable instructions embodied thereon that, when executed, by one or more processors can cause the one or more processors to perform the methods in the technical solution system.

Turning to FIG. 3, a flow diagram is provided that illustrates a method 300 for performing hard link operations for files in a file system. Initially at block 302, a file name for file content is received. The file name is associated with a hard link data structure having a File_Name-to-File_ID mapping and a File_ID-to-File_Object mapping. The file name is further associated with an alternate file name for the file content, wherein the alternate file name is associated with an alternate hard link data structure having an alternate File_Name-to-File mapping and the File_ID-to-File_Object mapping. The hard link data structure is a table having mappings as key-value pairs in corresponding rows and columns. The hard link data structure is implemented in a file system based on independent directories represented as tables comprising embedded tables as file objects for accessing files. At block 304, the file content is accessed using the file name.

At block 306, an alternate file name for the file content is received. The alternate file name is associated with an alternate hard link data structure having an alternate File_Name-to-File_ID mapping and the File_ID-to-File_Object mapping. At block 308, the file content is accessed using the alternate file name.

Turning to FIG. 4, a flow diagram is provided that illustrates a method 400 for performing hard link operations for files in a file system. Initially at block 402, a file name for file content is received. The file name is associated with a hard link data structure having a File_Name-to-File_ID mapping and a File_ID-to-File_Object mapping. At block 404, the file name is renamed. Renaming the file name comprises creating a different hard link data structure with a different file name for the file content. The different hard link data structure is created in a different directory (i.e., cross-directory renaming operation). At block 406, the file name is deleted. Deleting the file name comprises maintaining File_Name-to-File_ID mappings and File_ID-to-File_Object mappings in morgue hard link data structures associated with deleted file names or deleted directories.

Turning to FIG. 5, a flow diagram is provided that illustrates a method 500 for performing hard link operations for files in a file system. Initially at block 502, receive a file identifier for file content. The file identifier is associated with a file name and an alternate file name corresponding to the file content. The file identifier is associated with two hard link data structures each having a File_Name-to-File_ID mapping and a File_ID-to-File_Object mapping. At block 504, the file content is accessed using the file name.

Example File System Environment

With reference to the file system environment 600 that includes a file system (e.g., Resilient File System—ReFS), embodiments described herein support the functionality of the technical solution described above. The file system environment 600 includes distributed components of the file system that are communicatively implemented in combination with other integrated components that implement aspects of the technical solution. The file system environment 600 refers to the hardware architecture and software framework that support the functionality of the technical solution.

At a high level, the file system provides configuration rules (e.g., logic and data structures) used to manage storage and retrieval, and naming and grouping of data. In particular, the configuration rules are based on a copy-on-write (i.e., write-to-new) design. In this regard, the file system is a copy-on-write file system. In particular, an application programming interface operates with a storage engine to provide a write-to-new B+ key-value file system. The file system can support data integrity, file-level snapshots ("block cloning"), data tiering and dynamic layout on disks, among other functionality.

Figure 6:
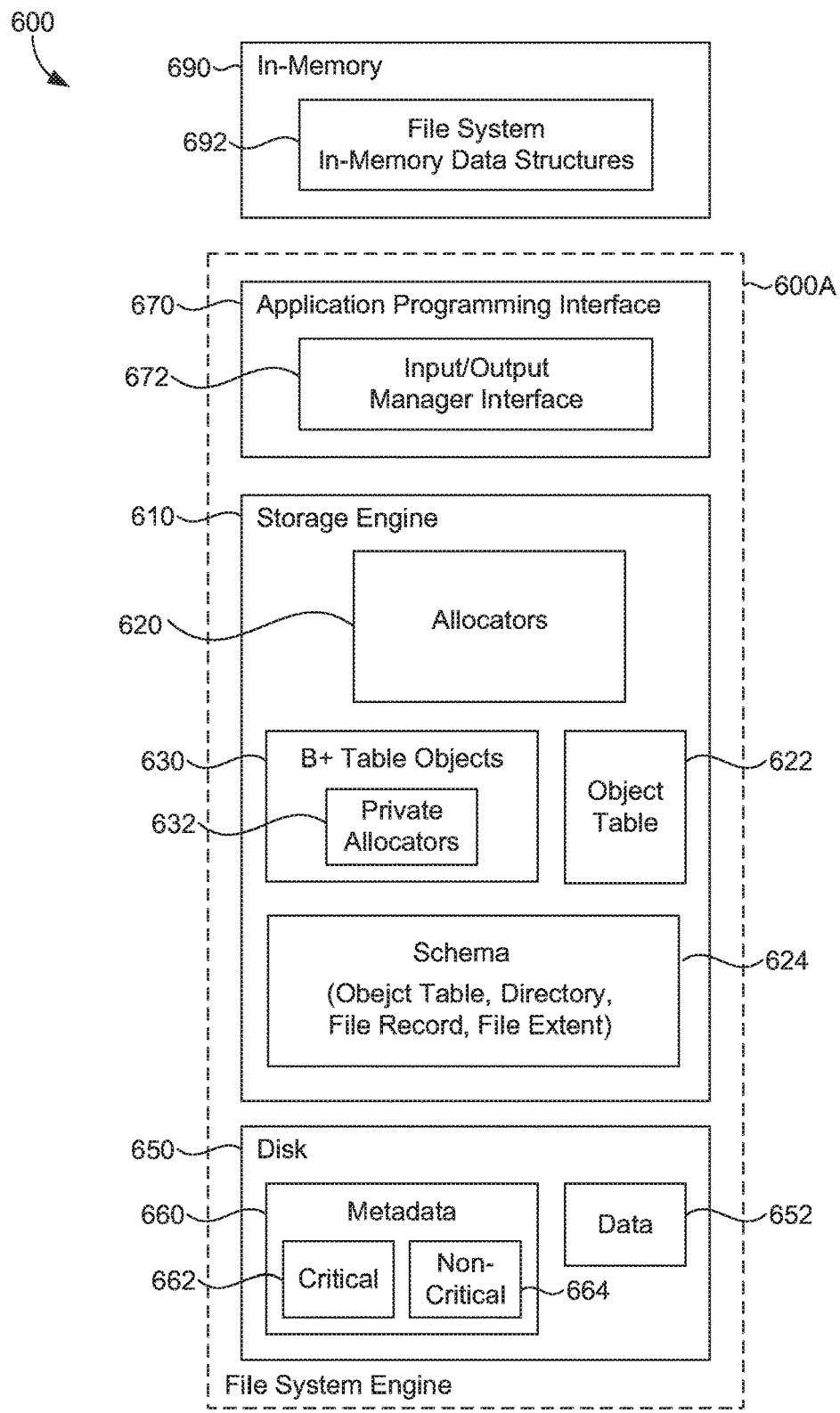
FIG. 6 provides a block diagram of an exemplary file system environment suitable for use in implementing aspects of the technology described herein.

FIG. 6 shows a high level architecture file system environment 600 having components in accordance with implementations of the present disclosure. It should be understood the arrangement described herein is set forth only as examples and other arrangements, instead of those shown, are contemplated. Among other components not shown, the file system environment 600 includes file system engine 600A having storage engine 610, disk 650, application programming interface 670, and in-memory 690. The storage engine 610 includes allocators 620, object table 622, and schema 624, B+ table objects 630 (with private allocators 632), and disk 650 includes files 652, and metadata 660 (with critical (metadata) 662, non-critical (metadata) 664); API 670 includes input/output manager interface 672; and in-memory 690 having file system in-memory data structures 692.

The storage engine 610 provides allocators (e.g., global allocators and private allocator) that allocate storage of table objects. In particular, the storage engine 610 provides B+ table objects 630 with internal private allocators 632, and an object table 622 to track the B+ table objects. The storage engine 610 supports storing roots of one B+ table within another B+ table and supports stream extents. Storing roots of B+ tables within another can leave the embedded table unable to have an entry in the object table. Directories are B+ table objects referenced by the object table 622. Files are B+ tables whose roots are embedded in the row of directories. Streams are implemented as a table of file extents whose roots are embedded in the file record.

In operation, the file system creates and manipulates B+ table objects in order to store file system metadata (e.g., critical and non-critical metadata) and uses the stream extent functionality for user stream data. In particular, the file system implements two types of metadata (i.e., global "critical" metadata 662 and non-critical metadata 664). Critical metadata 662 is managed independently of non-critical metadata 664. For example, writing critical metadata 662 is based on a different logic from the non-critical metadata 664 based on the separation from the critical metadata. Writing metadata may be implemented based on a locking mechanism.

The storage engine 610 supports a schema 624 for organizing information (e.g., B+ tables of files and directories) in the file system. For example, when a B+ table is created, the table object is assigned an ID in the object table. Every entry is a <key, value> pair in the form <object_id, root_location> where object_id is the volume-unique identifier of the object and root location is the block address of the root bucket of the table. Because all directories are durable table objects in file system, the vast majority of entries in the object table refer to directories.

Directories are B+ table objects that are responsible for a single, flat namespace. Directories logically contain files, links to files in other directories, and links to other directories. It is through directories and links to directories that the traditional hierarchical file system namespace is built. Rows in a directory table are logically of the form <key, <type, value>> where key is unique in the table, type indicates the way in which value should be interpreted, and value is then type-specific. Directories, being tables, are composed of rows.

Files 652 are stored in association with directories. For example, files 652 may have file records that are B+ tables rooted in a directory B+ table. Files in directories can appear as <key, value> pairs of the form <file_name, file_record>. In one implementation, file_name can be a Unicode string and file_record is an embedded B+ table. Embedded B+ tables in storage engine may embed only their roots in the value of another table. In this regard, a file_record is constructively the root of a table.

In-memory data structures of the file system support in-memory operations and other associated operations of the file system. At a high level, in-memory processing can be based on file objects, file control blocks (FCB) and stream control blocks (SCB). In particular, a file object points to the SCB data structure which represents a single data entity contained in a single file. The file that contains the data entity is represented by a file control block. Durable changes for the SCB and the FCB are supported using a B+ table. Every open file in file system can be implemented with a single FCB as its in-memory anchor. An open file with a single data stream also has an SCB representing that stream. The FCB, being responsible for the on-disk file record, points to the open storage engine B+ table object that represents the file. In this regard, files are B+ tables, while file attributes are rows in the B+ table.

The file system API 670 is an application programming interface through which services of the file system can be requested. For example, the input/output manger interface 672 can support read operations, write operations, metadata management operations, and maintenance operations (e.g., creating or initializing a file system, verifying the file system for integrity, and defragmentation). An operating system of a device using the file system can provide the API to support the file system operations. It is contemplated by various features of the technical solution of the present invention can be performed using file system environment 600 and other variations and combinations thereof.

Example Distributed Computing Environment

Figure 7:
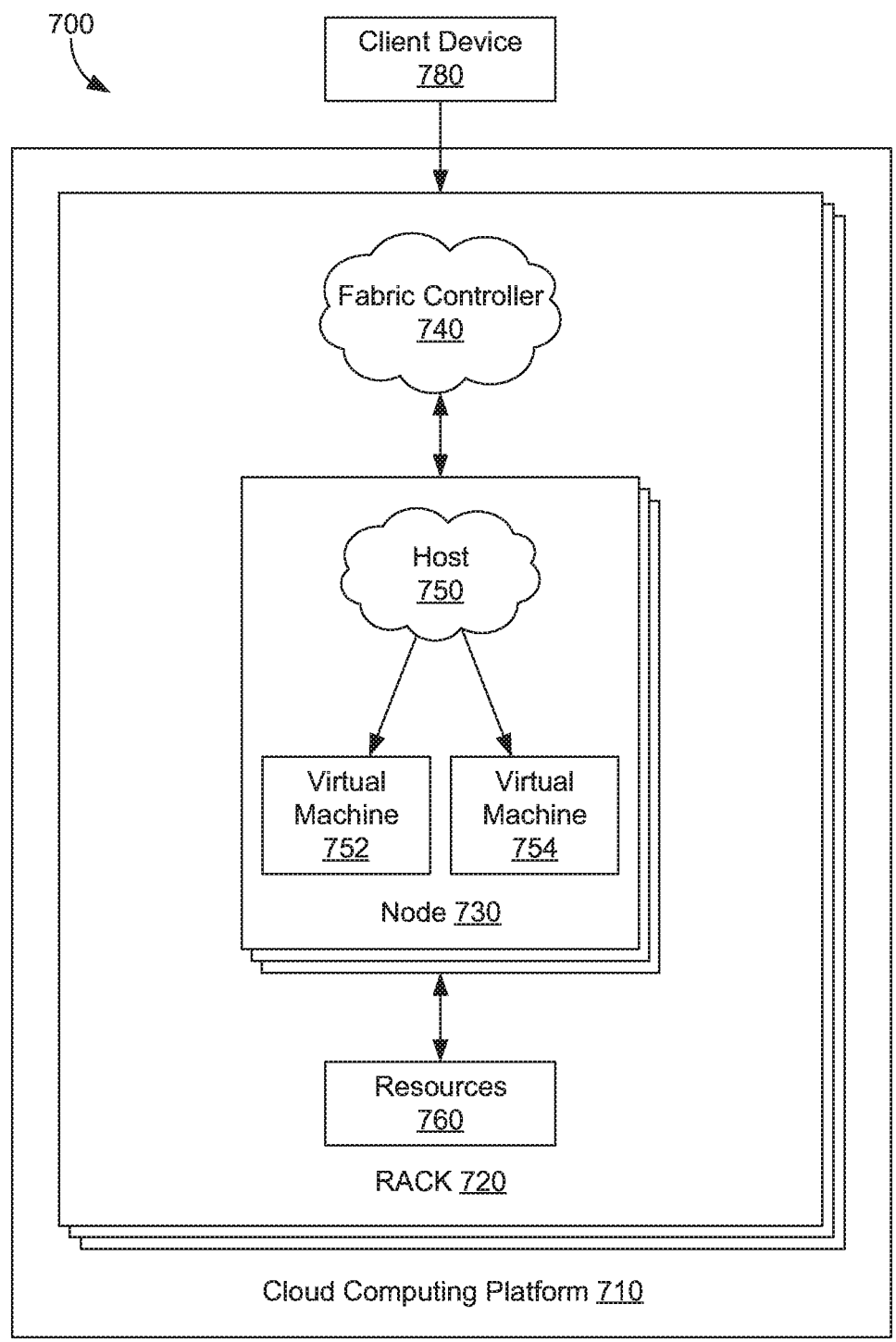
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Operating Environment

Figure 8:
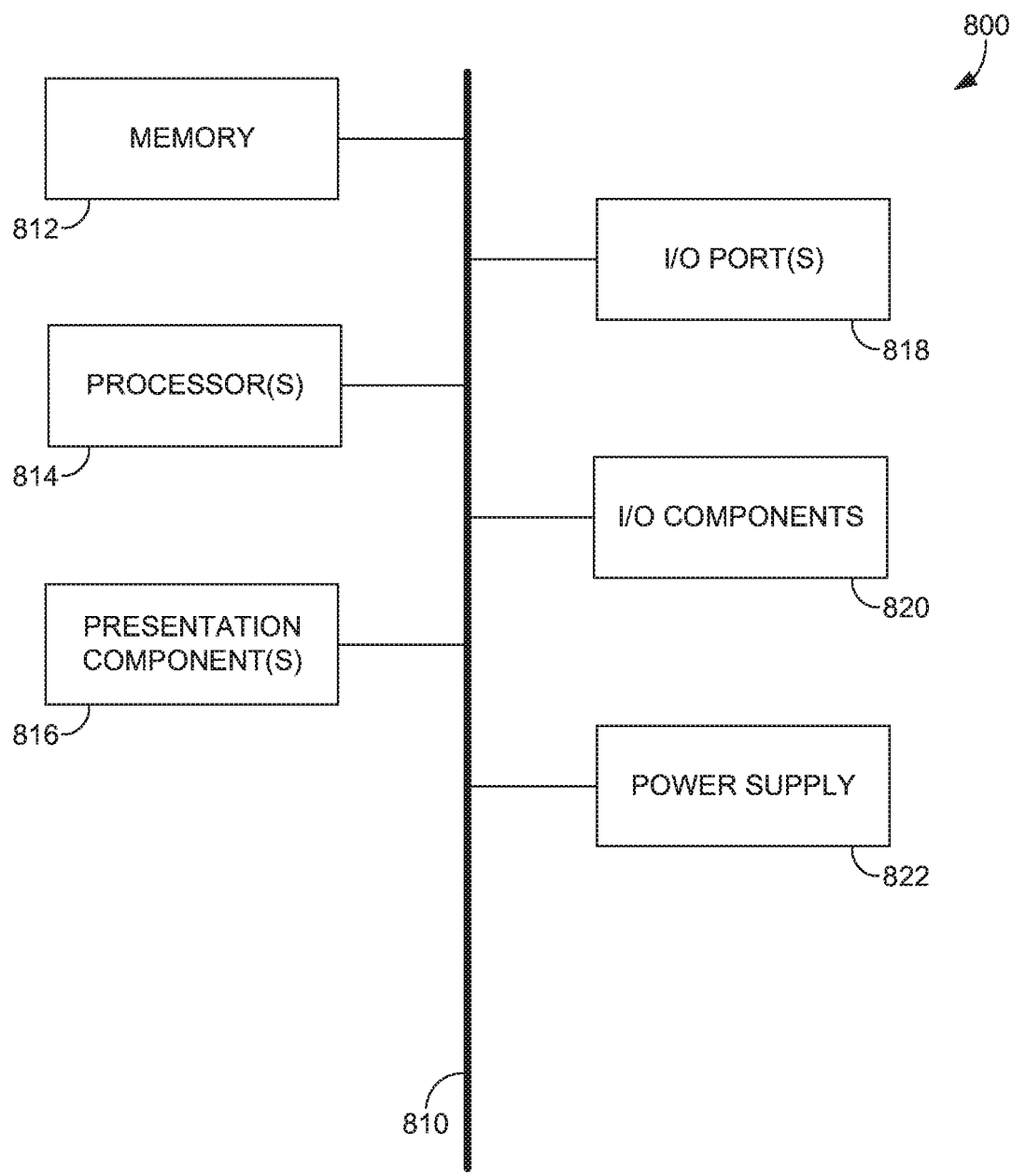
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computing system for providing hard link operations in file systems, the system comprising:
   one or more hardware processors; and
   one or more computer storage media storing computer-useable instructions that, when used by the one or more processors, cause the one or more processors to execute:
   receiving a file name for file content; and
   accessing the file content using the file name, wherein the file content is associated with a hard link data structure of a first directory implemented as a first independent directory, the hard link data structure of the first directory having a first File_ID-to-File Object mapping and a first File_Name-to-File ID mapping, and
   wherein the file content is associated with a hard link data structure of a second directory, the hard link data structure of the second directory having an alternate File_ID-to-File Object mapping and an alternate File_Name-to-File_ID mapping.

2. The computing system of claim 1, further comprising accessing an alternate file name for the file content associated with the alternate File_Name-to-File ID mapping; and
   executing an alternate data operation using the alternate file name and the hard link data structure of the second directory.

3. The computing system of claim 1, wherein hard link data structures are tables having mappings as key-value pairs in corresponding rows and columns, wherein the hard link data structures are implemented in a file system based on independent directories represented as tables comprising embedded tables as file objects for accessing files.

4. The computing system of claim 1, wherein hard link data structures are implemented in a file system based on independent directories, where the file system operates based on isolating functionality of the independent directories as isolated tables based on an independent directory policy of the file system that supports parallelism and throughput, wherein the second directory is the same as the first directory.

5. The computing system of claim 1, further comprising receiving a file identifier for the file content; and
accessing the file content using the file identifier, wherein the file identifier is associated with the hard link data structure of the first directory and the hard link data structure of the second directory.

6. The computing system of claim 1, wherein accessing the file content further comprises renaming the file name for the file content, wherein renaming the file name comprises creating a different hard link data structure with a different file name for the file content, the different hard link data structure is created in a different directory.

7. The computing system of claim 1, wherein accessing the file content further comprises deleting the file name, wherein deleting the file name comprises maintaining File_ID-to-File_Object mappings in morgue hard link data structures associated with deleted file names.

8. One or more computer storage media having computer-executable instructions embodied thereon that, when executed, by one or more processors, cause the one or more processors for providing hard link operations in file systems, the method comprising:
receiving a file name for file content; and
accessing the file content using the file name, wherein the file content is associated with a hard link data structure of a first directory implemented as a first independent directory, the hard link data structure of the first directory having a first File_ID-to-File Object mapping and a first File_Name-to-File ID mapping, and
wherein the file content is associated with a hard link data structure of a second directory, the hard link data structure of the second directory having an alternate File_ID-to-File Object mapping and an alternate File_Name-to-File_ID mapping.

9. The media of claim 8, further comprising accessing an alternate file name for the file content associated with the alternate File_Name-to-File ID mapping; and
executing an alternate data operation using the alternate file name and the hard link data structure of the second directory.

10. The media of claim 8, wherein hard link data structures are tables having mappings as key-value pairs in corresponding rows and columns, wherein the hard link data structures are implemented in a file system based on independent directories represented as tables comprising embedded tables as file objects for accessing files.

11. The media of claim 8, wherein hard link data structures are implemented in a file system based on independent directories, where the file system operates based on isolating functionality of the independent directories as isolated tables based on an independent directory policy of the file system that supports parallelism and throughput, wherein the second directory is the same as the first directory.

12. The media of claim 8, further comprising receiving a file identifier for the file content; and
accessing the file content using the file identifier, wherein the file identifier is associated with the hard link data structure of the first directory and the hard link data structure of the second directory.

13. The media of claim 8, wherein accessing the file content further comprises renaming the file name for the file content, wherein renaming the file name comprises creating a different hard link data structure with a different file name for the file content, the different hard link data structure is created in a different directory.

14. The media of claim 8, wherein accessing the file content further comprises deleting the file name, wherein deleting the file name comprises maintaining File_ID-to-File_Object mappings in morgue hard link data structures associated with deleted file names.

15. A computer-implemented for providing hard link operations in file systems, the method comprising:
receiving a file name for file content; and
accessing the file content using the file name, wherein the file content is associated with a hard link data structure of a first directory implemented as a first independent directory, the hard link data structure of the first directory having a first File_ID-to-File Object mapping and a first File_Name-to-File ID mapping, and
wherein the file content is associated with a hard link data structure of a second directory, the hard link data structure of the second directory having an alternate File_ID-to-File Object mapping and an alternate File_Name-to-File_ID mapping.

16. The method of claim 15, further comprising accessing an alternate file name for the file content associated with the alternate File_Name-to-File ID mapping; and
executing an alternate data operation using the alternate file name and the hard link data structure of the second directory.

17. The method of claim 15, wherein hard link data structures are tables having mappings as key-value pairs in corresponding rows and columns, wherein the hard link data structures are implemented in a file system based on independent directories represented as tables comprising embedded tables as file objects for accessing files.

18. The method of claim 15, further comprising receiving a file identifier for the file content; and
accessing the file content using the file identifier, wherein the file identifier is associated with the hard link data structure of the first directory and the hard link data structure of the second directory.

19. The method of claim 15, wherein accessing the file content further comprises renaming the file name for the file content, wherein renaming the file name comprises creating a different hard link data structure with a different file name for the file content, the different hard link data structure is created in a different directory.

20. The method of claim 15, wherein accessing the file content further comprises deleting the file name, wherein deleting the file name comprises maintaining File_ID-to-File_Object mappings in morgue hard link data structures associated with deleted file names.

* * * * *